Figure 10:
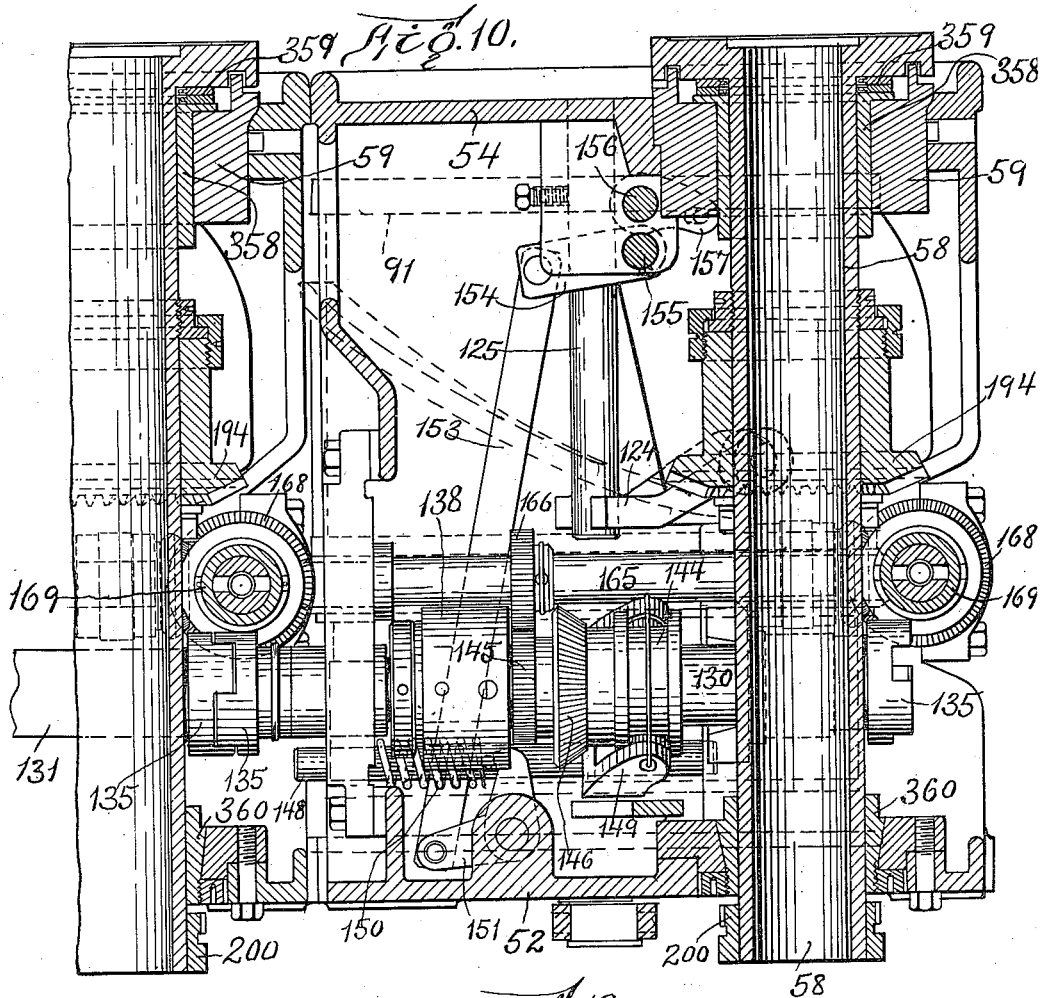

J. HARTNESS.
MULTISPINDLE LATHE.
APPLICATION FILED JULY 25, 1914.
1,130,277.
Patented Mar. 2, 1915.
13 SHEETS—SHEET 1.
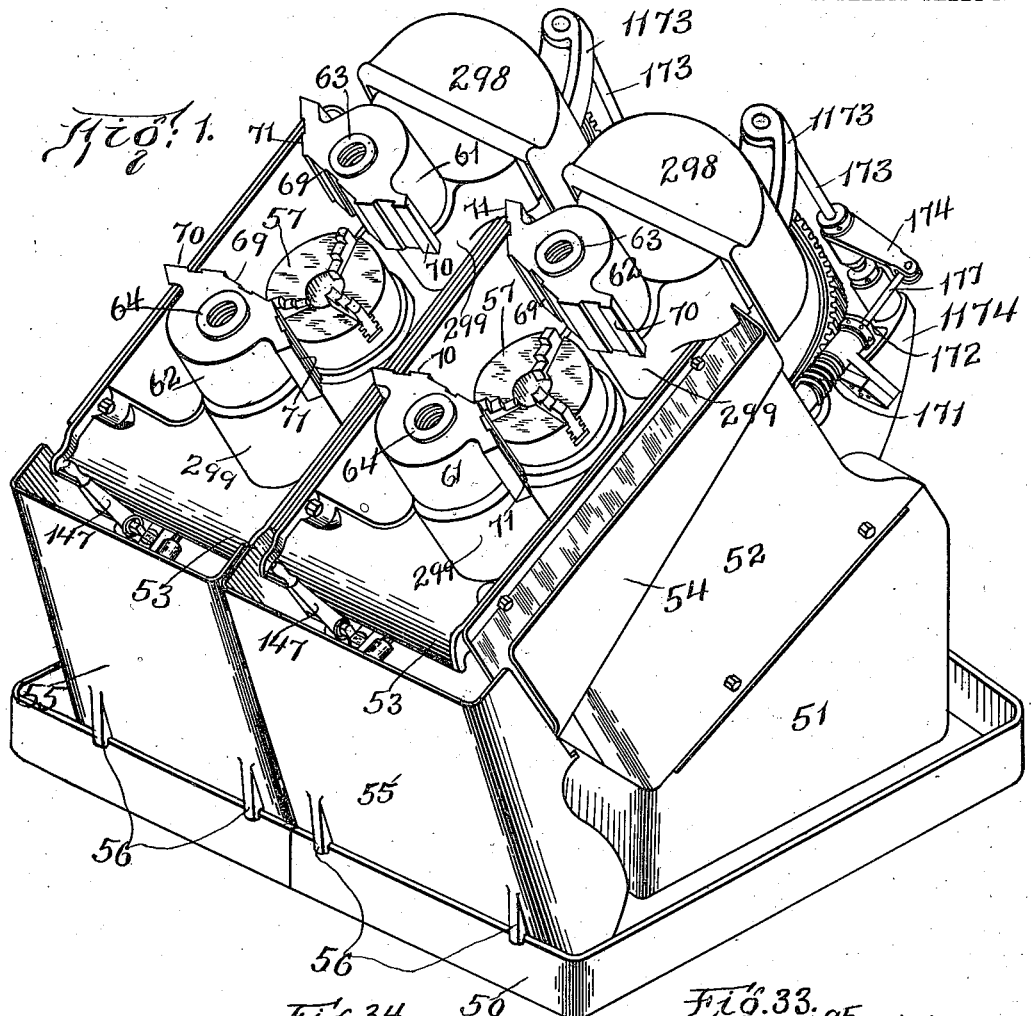
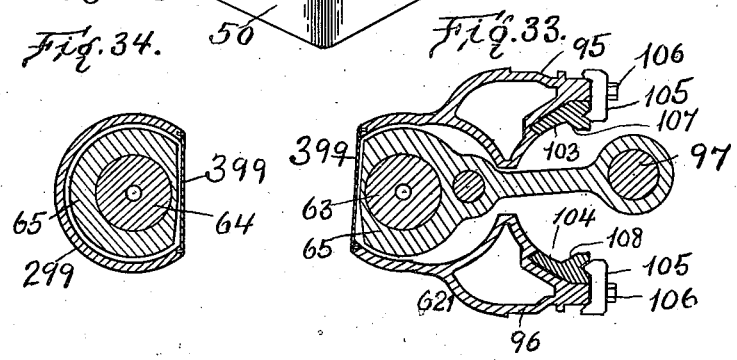
Witnesses:
E. R. Brannen
O. N. Pezzetti
Inventor:
James Hartness
By Wright Brown Quinby May
Attorneys

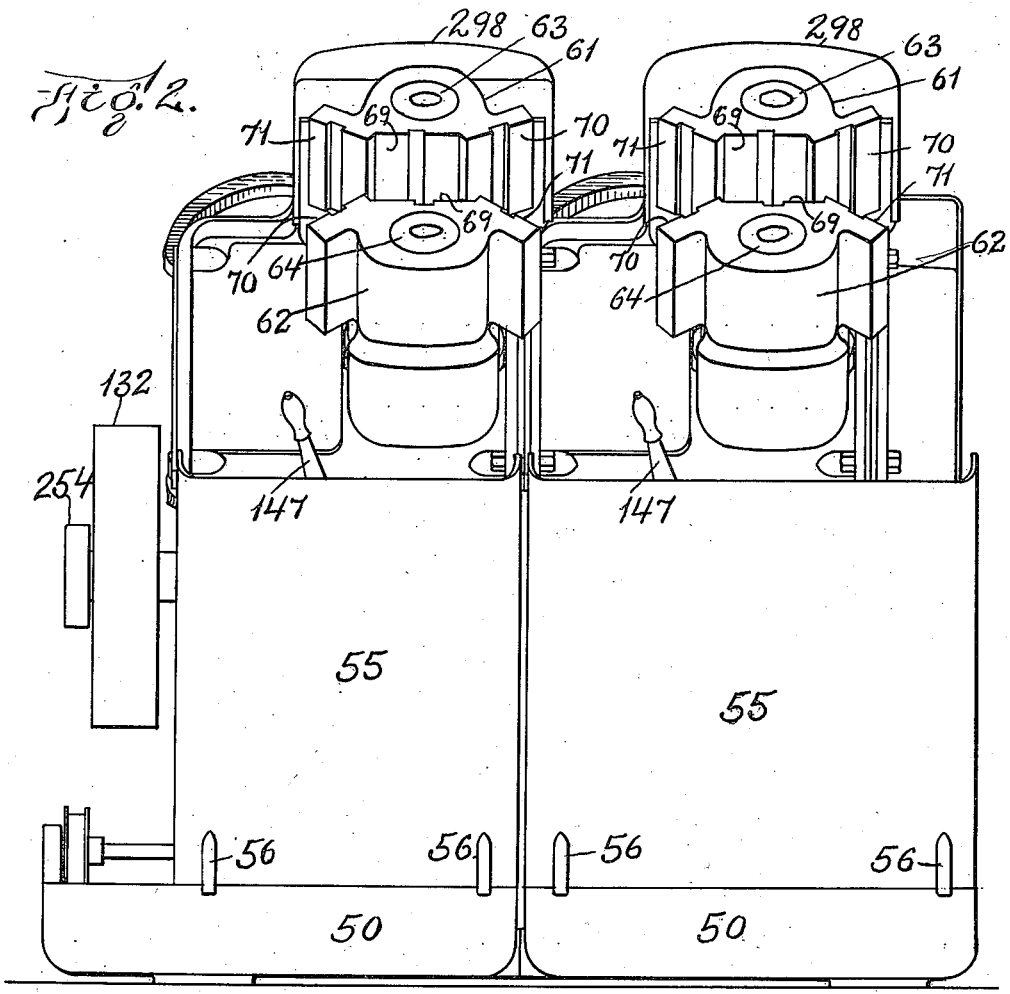

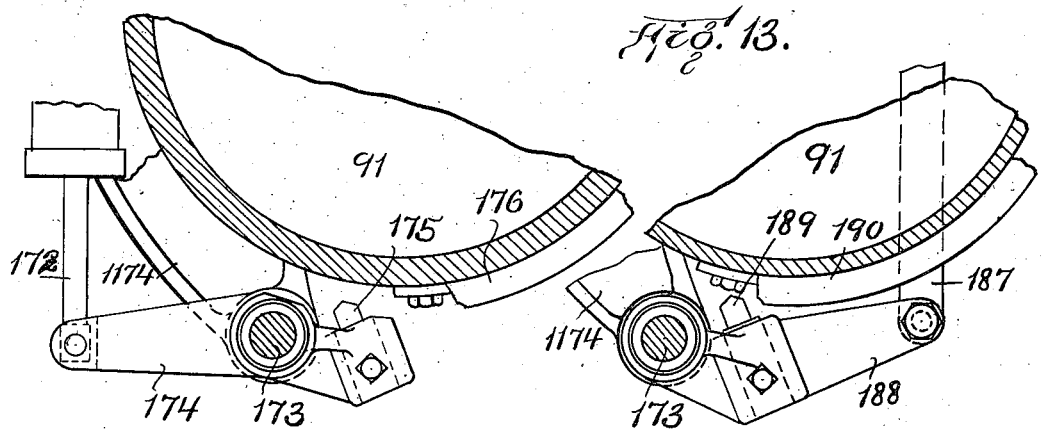
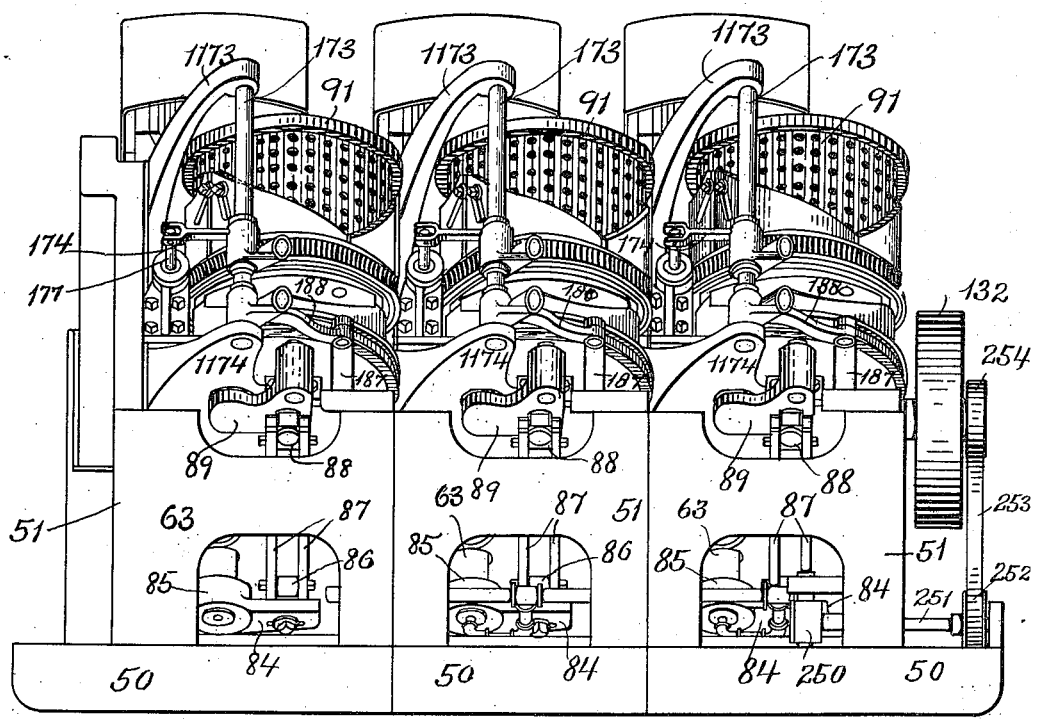

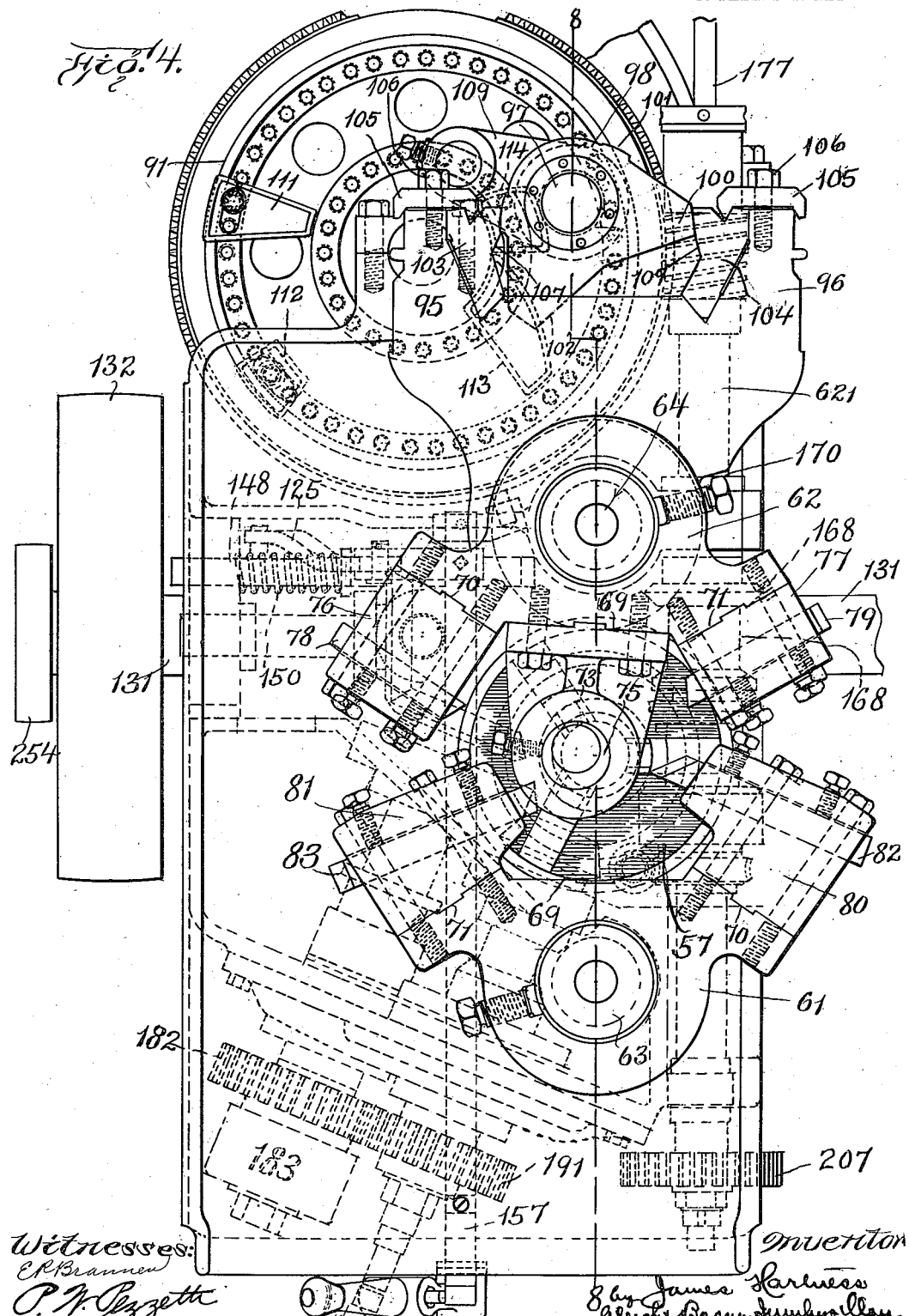

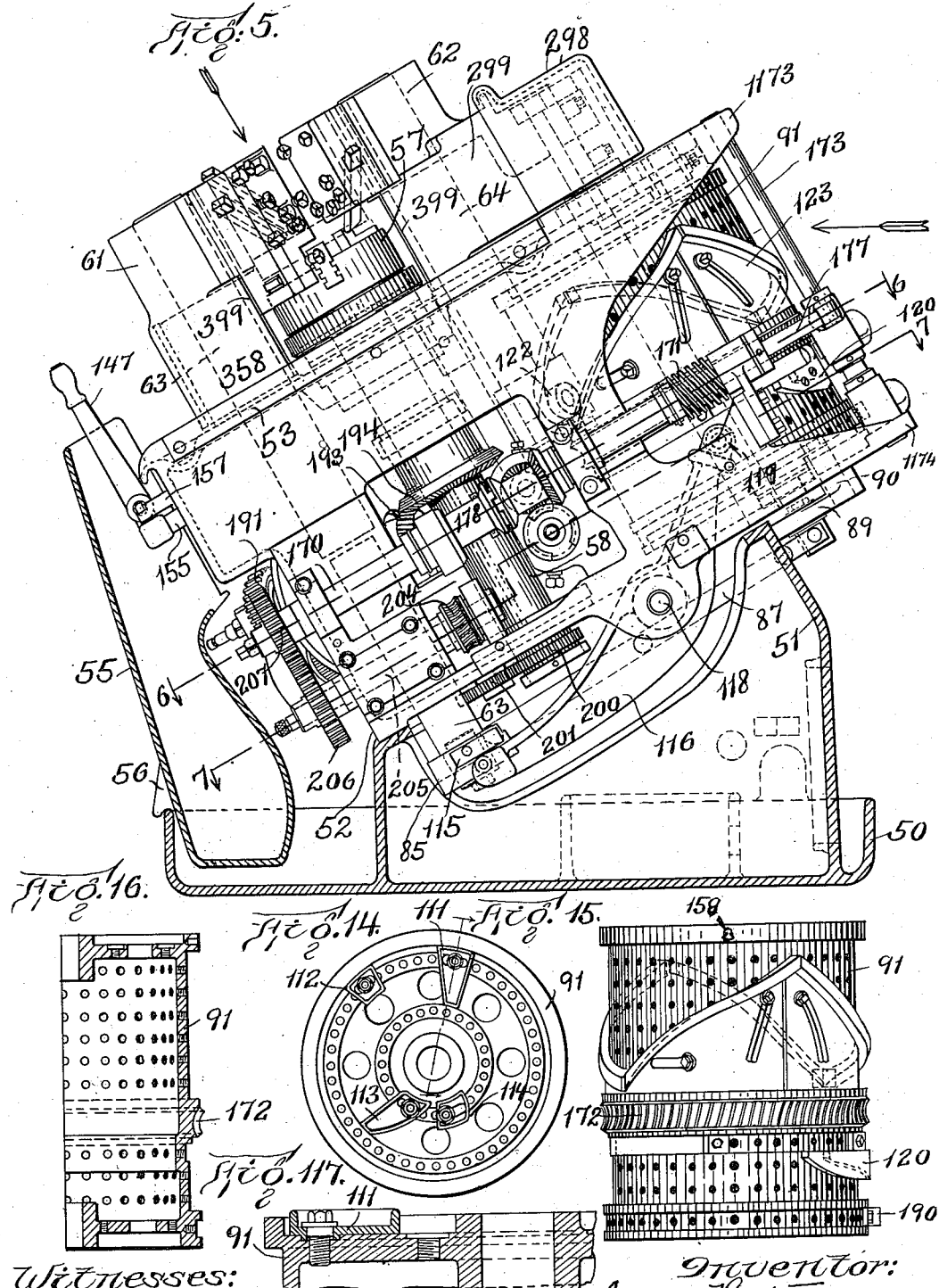

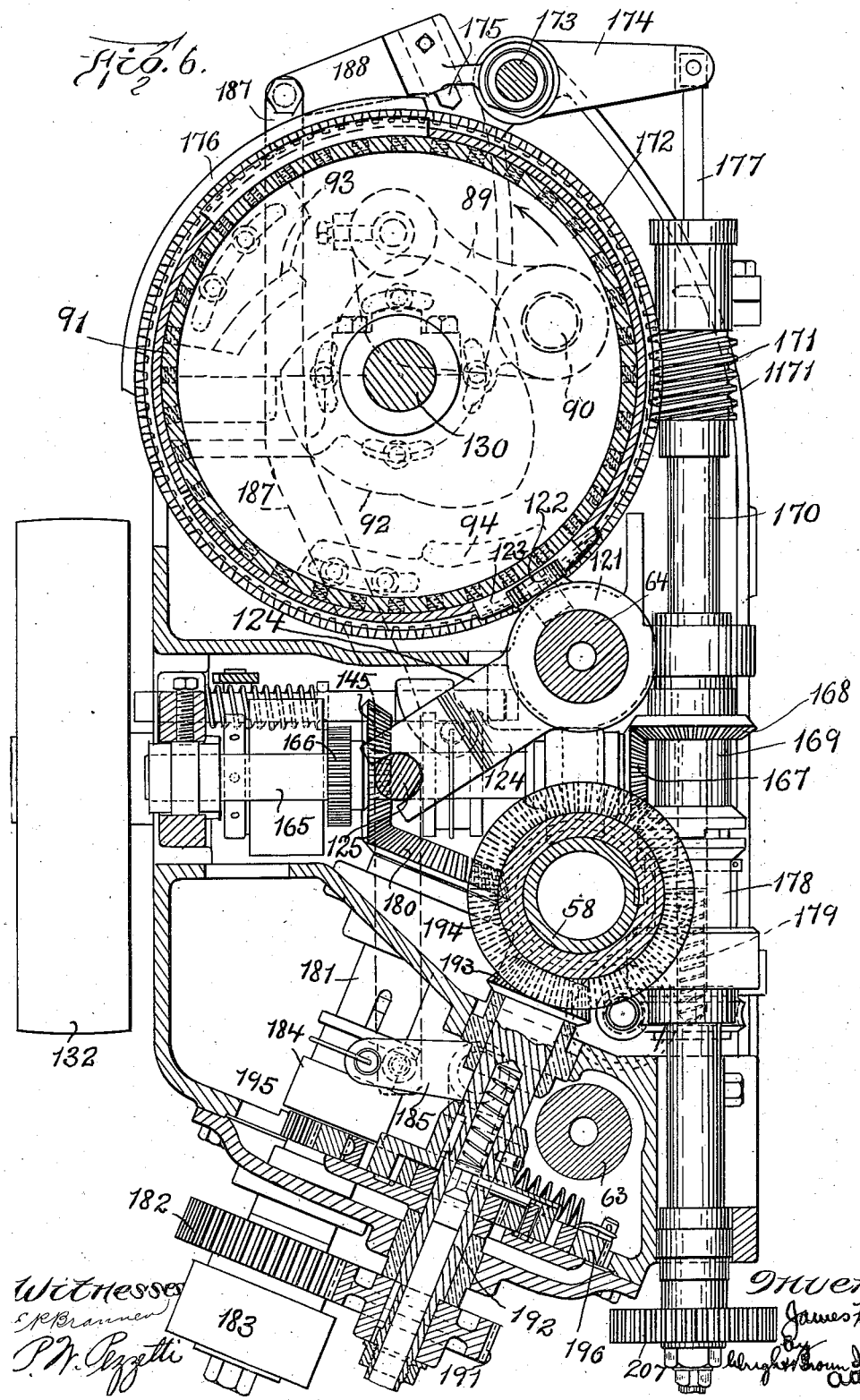

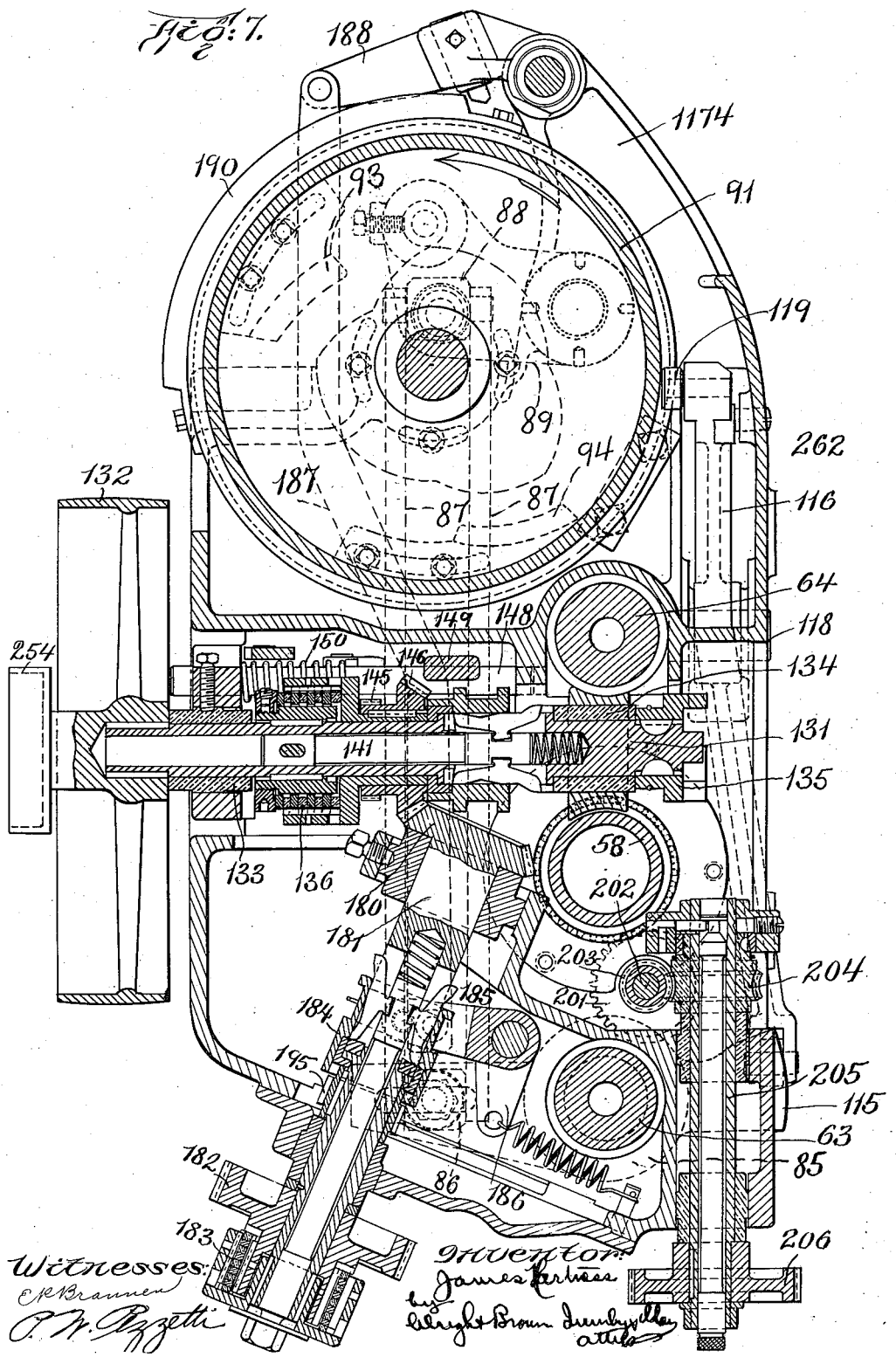

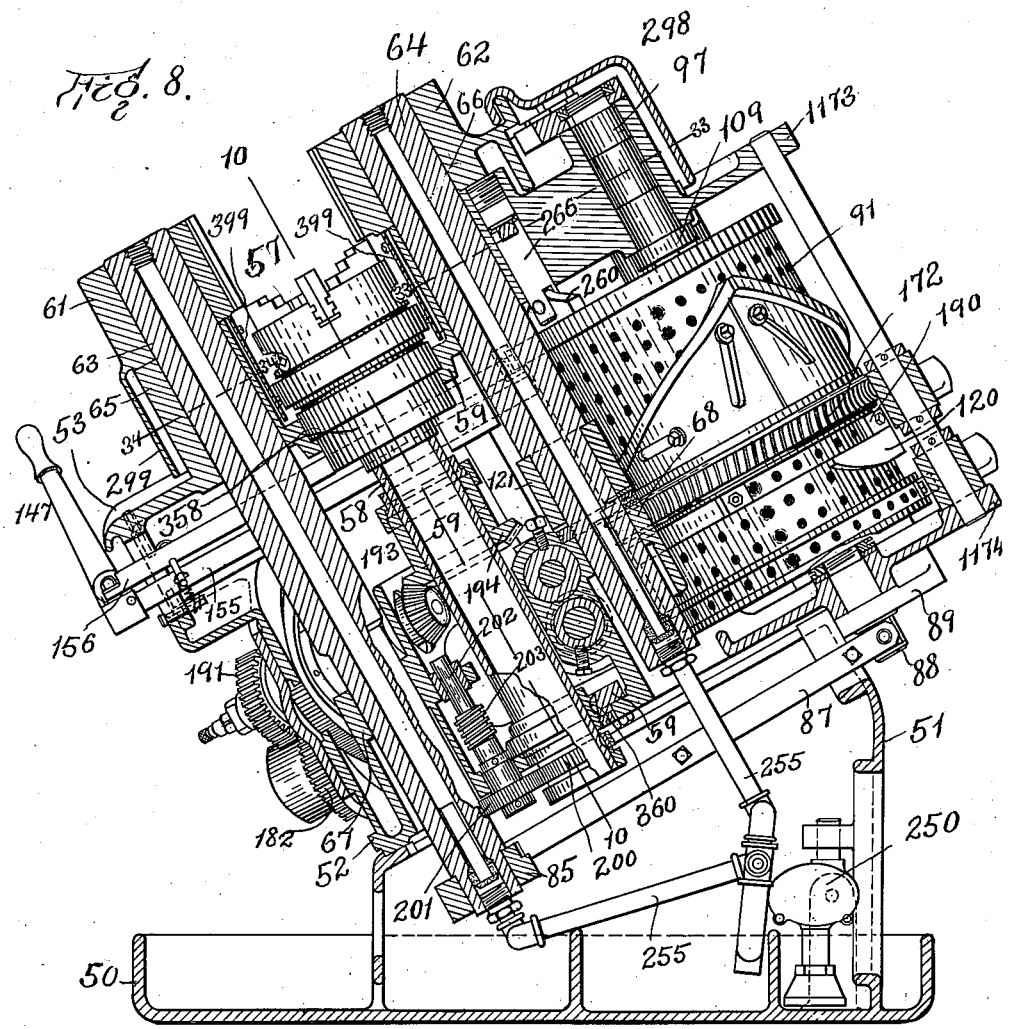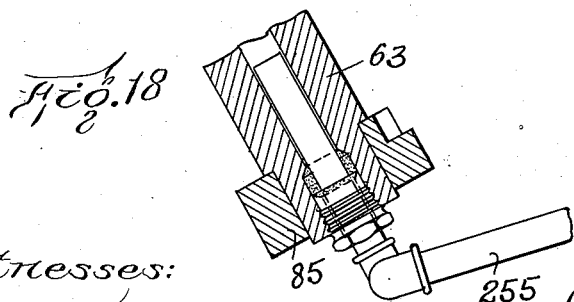

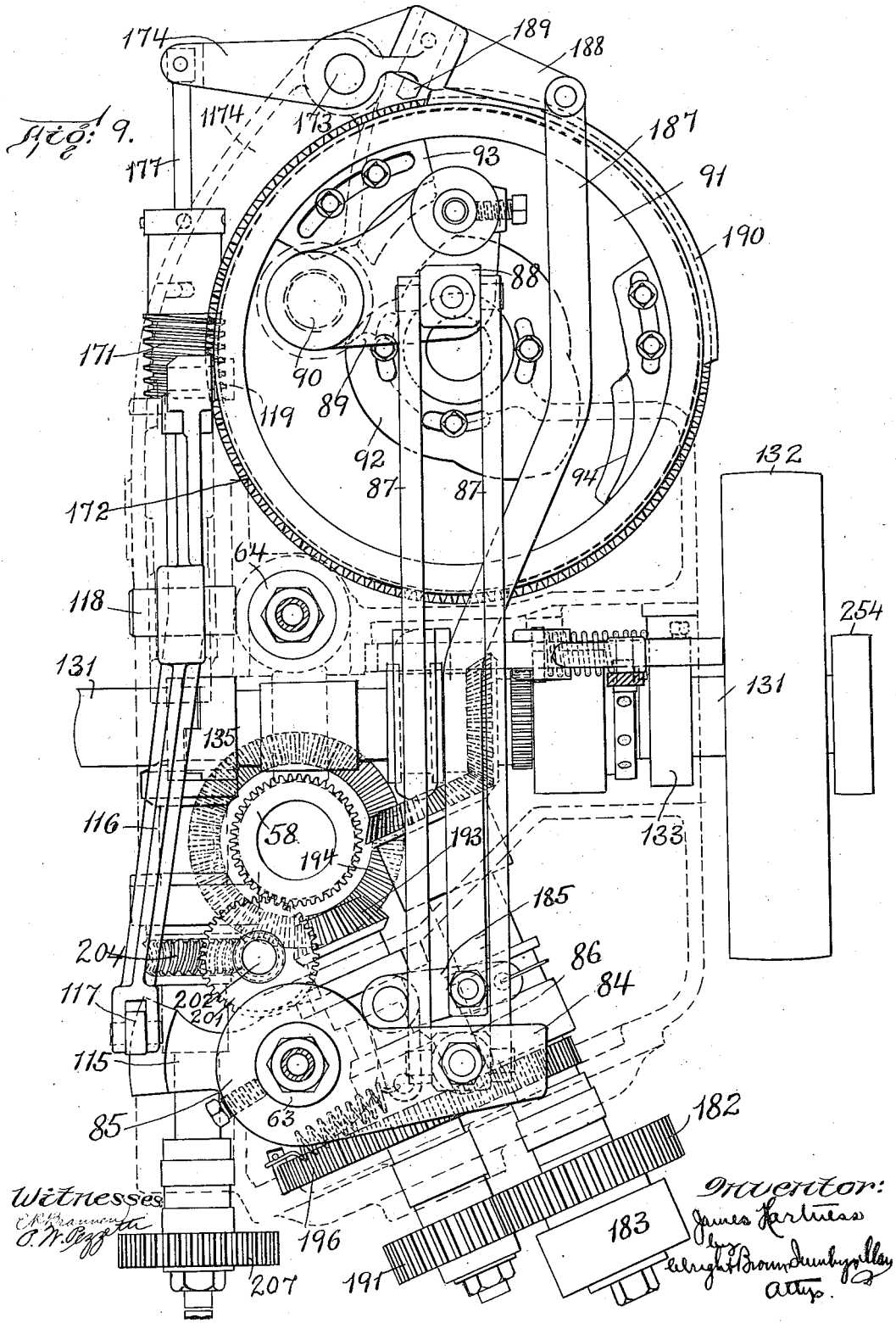

J. HARTNESS.
MULTISPINDLE LATHE.
APPLICATION FILED JULY 25, 1914.

1,130,277.

Patented Mar. 2, 1915.
13 SHEETS—SHEET 10.

Witnesses:
Inventor:
James Hartness

J. HARTNESS.
MULTISPINDLE LATHE.
APPLICATION FILED JULY 25, 1914.
1,130,277.
Patented Mar. 2, 1915.
13 SHEETS—SHEET 11.
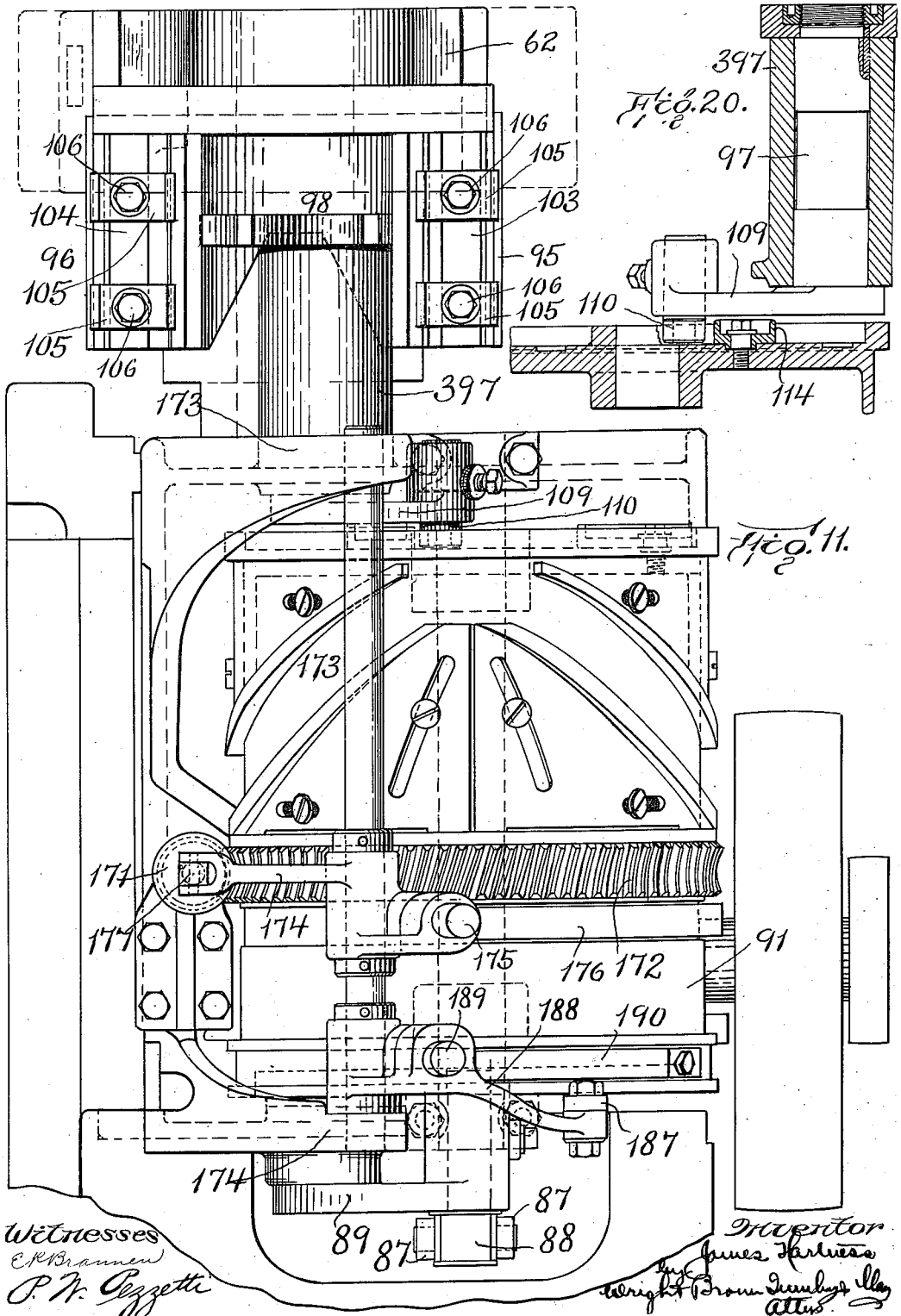

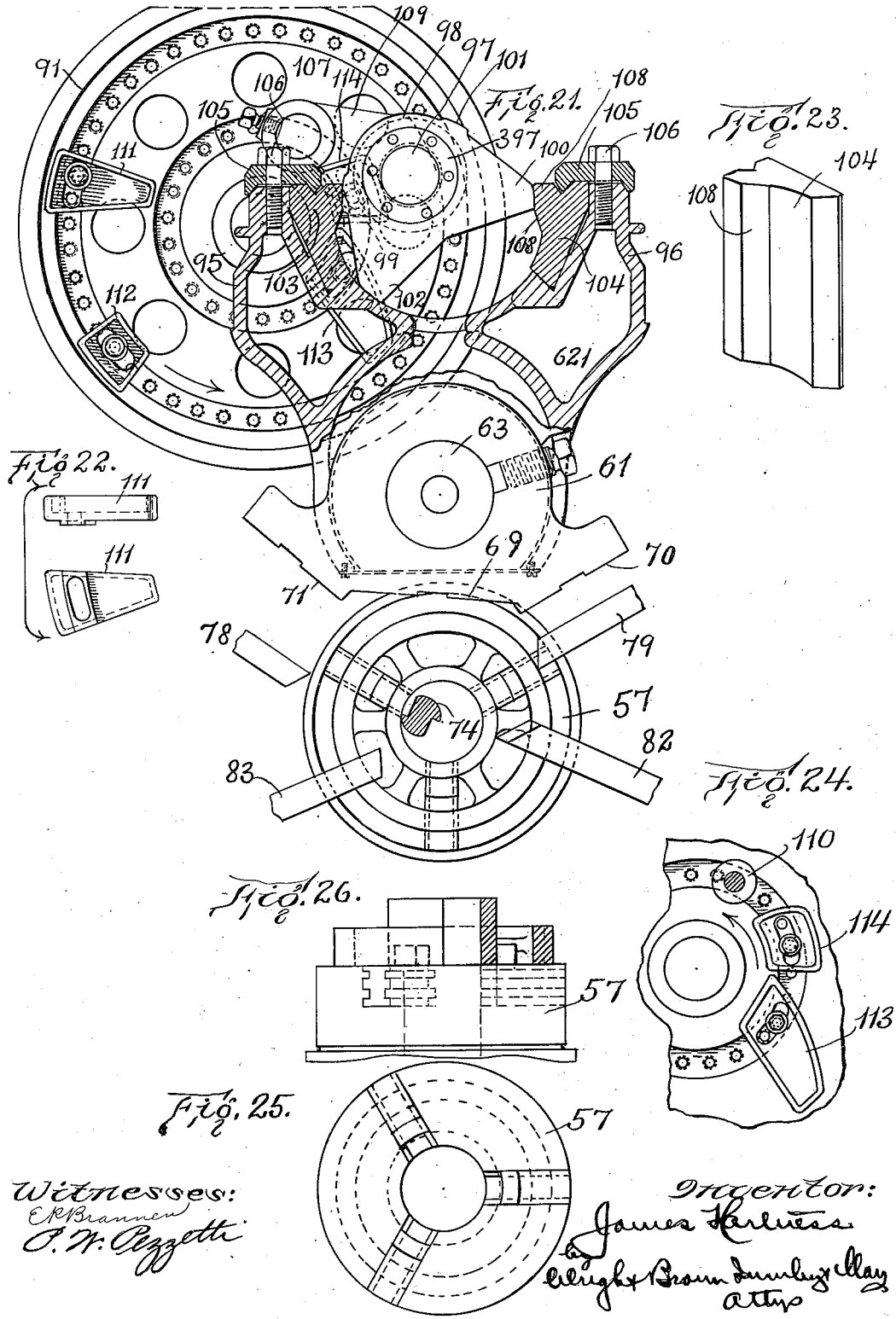

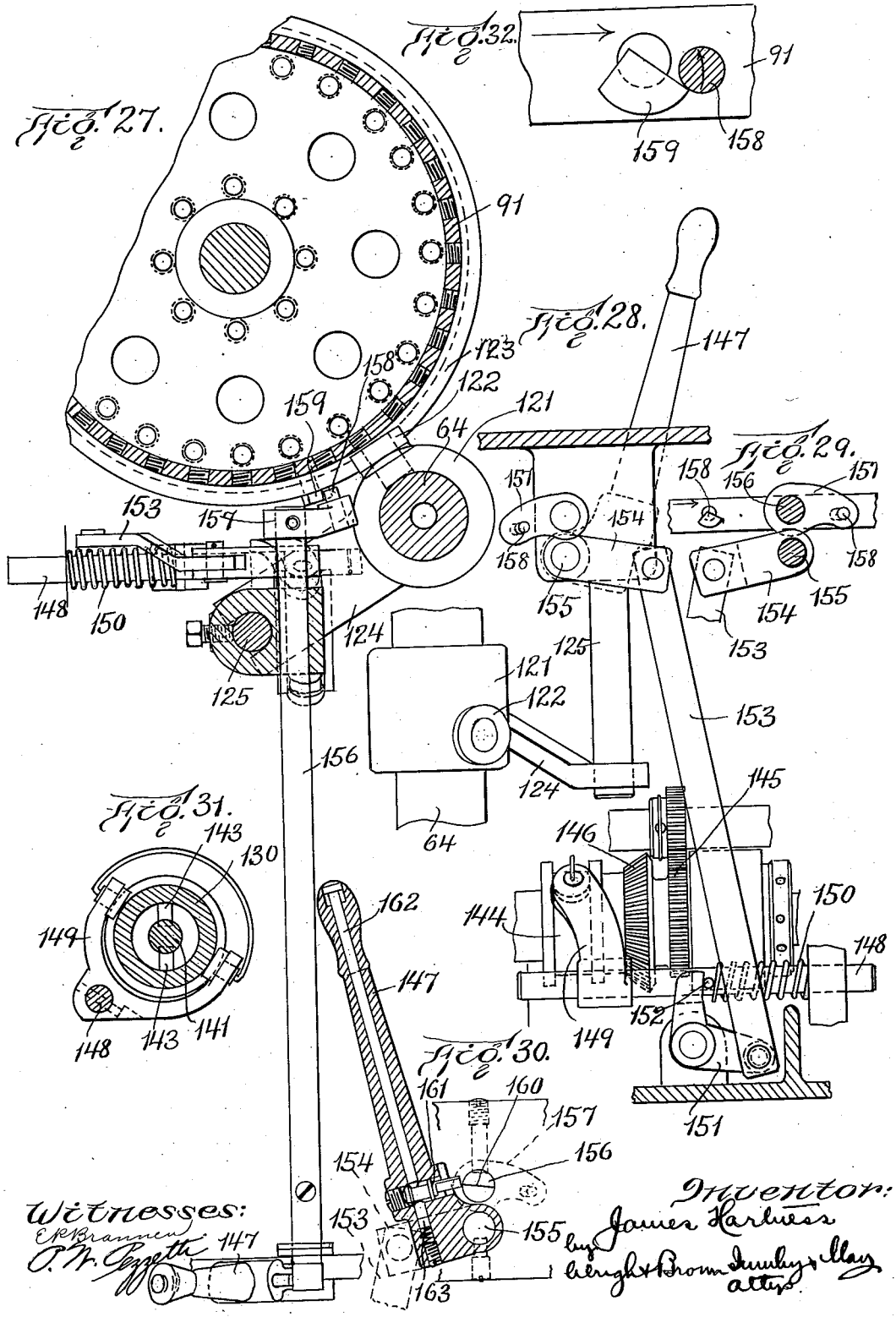

UNITED STATES PATENT OFFICE.

JAMES HARTNESS, OF SPRINGFIELD, VERMONT.

MULTISPINDLE LATHE.

1,130,277.  Specification of Letters Patent.  Patented Mar. 2, 1915.

Application filed July 25, 1914. Serial No. 853,114.

*To all whom it may concern:*

Be it known that I, JAMES HARTNESS, a citizen of the United States, and a resident of Springfield, in the county of Windsor and State of Vermont, have invented certain new and useful Improvements in Multispindle Lathes, of which the following is a specification.

This invention has relation to metal-working machines of the lathe type in which the work to be faced or turned is rotated, and the tools are length- and cross-fed to perform their proper operations; and while the invention has more particular relation to that class of such machines known as "chucking lathes" in which the work consists of detached pieces upon which the various operations are to be performed by the tools, yet so far as many features of the invention are concerned, it may be embodied in machines of the bar or screw class. Such chucking lathes, as their name implies, are provided with a work holder which usually takes the form of a chuck, by which the detached piece of work may be held so as to expose to the tools that portion which is to be operated upon.

The primary object of the invention is to provide a lathe of such narrow compact form that it will occupy laterally a minimum amount of space in a shop, and so to arrange the mechanism that the work-holding instrumentalities may be easily observed from the end of the narrow structure, in consequence of which, if desired, a number of such instrumentalities may be grouped closely together for observation and control by a single operator.

Another object of the invention is to provide a construction and arrangement of the work-holding and tool-operating mechanisms in an inclined or tilted position, so that, without assuming an unnatural posture, or craning his neck, the operator may comfortably observe tools performing external and internal operations.

A further object of the invention is to provide a machine which shall consist of a series of separable units, each unit comprising a work holder, associated tool holders, and the necessary mechanism for causing the proper sequence of operation of the tools upon the work, with provisions for the attachment together of a variable number of such units as may be found most desirable to be controlled by a single operator.

The invention has further for its object to provide certain improvements in semi-automatic lathes for simplifying the construction of the mechanisms which control location of the work spindle and the operations of the tools.

In attaining the objects thus referred to, the machine, which is illustrated upon the drawings as one embodiment of the invention, consists of a series of units arranged side by side. These units, comprising frames, work holders and tool holders, and mechanism for operating them, are formed to provide a very compact and narrow arrangement in which the work holder and tool carriers are placed so as to be seen from the end of the frame. This facilitates banking a number of these units together with the work holders in close proximity. Ordinarily a lathe is relatively long and narrow, say from six to ten feet long, and the operator stands at the long side of the machine, so that the pieces of work held in a plurality of machines in a row are separated by a distance of six to ten feet, making it impossible for an operator to watch carefully the operation of all the tools on the work.

The present machine contemplates a series of units so narrow that, when grouped together, the pieces of work under observation are spaced apart about a distance of two feet, and hence an operator can observe and control the operation of three or four units without materially changing his position. In each unit, according to the particular embodiment of the invention here shown, the axis of the work spindle is at an inclination both to the vertical and to the horizontal, and extends at an inclination forwardly and downwardly so that, to an operator standing in front of the machine, the work is positioned most favorably for observation. Each unit may be complete in itself and be provided with its own driving pulley, but for convenience, I may employ a common driving shaft, and, in fact may, if desired, utilize common mechanism for operating the instrumentalities of the several units and still retain the valuable features which I have hereinbefore referred to,—the positioning of the work, and the close grouping of the work spindles.

Figure 19:
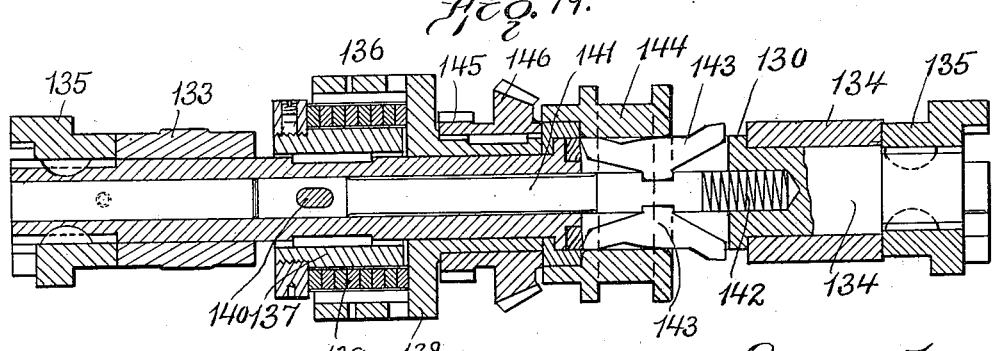

On the drawings: Figure 1 represents, in perspective view, a machine embodying the invention. Fig. 2 shows a front elevation of the same. These two figures show a machine having but two units. Fig. 3 shows a rear elevation of the machine in which three units are employed. Fig. 4 represents a view looking down on the top of the bedplate. Fig. 5 represents a side elevation of the machine and shows the chip pan or receptacle in section. Fig. 6 represents a section on line 6—6 of Fig. 5. Fig. 7 represents a section on the line 7—7 of Fig. 5. Fig. 8 represents a front-to-rear section on the line 8—8 of Fig. 4. Fig. 9 represents what may be termed an inverted plan, in which the parts are shown as they appear when looking upward from below the machine, the framework being shown in dotted lines. Fig. 10 represents an inclined vertical section through the work spindle and shows the adjacent parts. Fig. 11 is a view looking from the rear and shows the cam-drum mechanism and a tool holder of one of the units. Figs. 12 and 13 (Sheet 3) illustrate respectively the cam-operated controlling levers which vary the spindle speed and the drum speed. Figs. 14 to 17 inclusive (Sheet 5) illustrate in detail one of the cam drums. Fig. 18 (Sheet 8) illustrates the connection between one of the oil conduits and one of the tool slides or carrying bars. Fig. 19 (Sheet 10) shows in section the main drive shaft, and the parts thereon. Fig. 20 (Sheet 11) illustrates a portion of the cam and mechanism for oscillating one of the tool carriers. Fig. 21 (Sheet 12) shows, partly in plan view and partly in section, a cam-operated mechanism for oscillating one of the tool carriers, and shows in addition the relation of certain of the tools upon said carrier to work undergoing operation. Fig. 22 shows in side and plan view one of the cams on the cam drum. Fig. 23 illustrates one of the wear blocks on the tool carrier. Fig. 24 shows a portion of the end of the cam drum, and some of the cams for operating one of the tool carriers. Figs. 25 and 26 illustrate respectively a plan view and a side elevation of a chuck with a piece of work grasped therein so as to be operated upon by the tool. Fig. 27 illustrates detached, and in detail, the cam-controlled knock-off mechanism. Fig. 28 is a detail view illustrating a part of the cam-controlled knock-off mechanism, and the controlling lever for the main clutch. Fig. 29 illustrates in detail a portion of the knock-off mechanism. Fig. 30 shows in section one of the controller handles, and a portion of the knock-off mechanism. Fig. 31 represents a cross section of the main drive shaft and shows the clutch-operating yoke. Fig. 32 illustrates a portion of the cam drum with the cam thereon for operating the knock-off mechanism. Fig. 33 illustrates a section on the line 33—33, and Fig. 34 illustrates a section on the line 34—34 of Fig. 8, of the two tool slides and their bearings or bosses.

Before proceeding to describe the machine which is illustrated upon the drawings, I desire it to be understood that the drawings are necessarily conventional and that no attempt has been made to show the parts in their exact size or form or to show the exact cam paths which may be necessary for operations upon any particular piece of work. I also desire to have it understood, as previously stated, that the invention and the various portions thereof may be embodied in machines of other construction than that illustrated, as will be readily appreciated by those skilled in the art to which this invention relates.

As previously indicated, the illustrated machine comprises a series of independent separable units, each unit including a frame, a work spindle, one or more tool carriers, and instrumentalities under the control of a handle or lever for causing the various tools to operate in the desired sequence upon the work. Each unit is narrow, as has been explained, and the tool holders and the work support are located at the front end thereof, so that when the units are banked together the work spindles are arranged side by side in close proximity where a plurality of them may be under the observation and control of a single operator. In addition to thus constructing a plurality of independent units, each unit is arranged with the work spindle tilted downward and forwardly so that the chuck or work-receiving portion of the spindle is arranged about waist high, or at some distance below the eyes of the operator, whereby without assuming any unnatural position the operator may comfortably watch the operation of the tools and inspect the results of their work, whether they be acting upon the interior or exterior of the work. Because of their stability of control and rigidity of construction I have utilized oscillatory and axially reciprocatory tool holders of the general form of those illustrated in my copending application, Serial No. 819,439, filed February 18, 1914. Two of these tool holders are employed in each unit to present the tools to the work upon the work support. Instead, however, of utilizing separate cam drums for controlling the tool holders as described in said application, each unit may be provided with a single cam drum and with associated mechanism for causing the tool holders to present their tools simultaneously or sequentially, as required for the particular piece of work which is undergoing operation.

The several units may be driven independently of each other by separate driving shafts, as stated; but for convenience I provide said units with a common driving shaft which is formed in sections so that the ends thereof may be connected together when the units are banked or attached one to the other. In such event, one of the sections of the shaft is provided with a pulley by which power is transmitted thereto. Each unit is provided with change-speed mechanism for causing the work spindle and the cam drum to be driven at different speeds.

By reason of the inclination of the several units the top of the framework of each is conveniently arranged at such an inclination that the chips or cuttings may slide forward therefrom, and consequently I provide each unit with what may be termed a chip pan, which is located in front of the frame to receive the chips and which may be detached or thrown forward, so as to discharge the chips or cuttings into a truck or other convenient means for their removal.

Inasmuch as the units which compose the machine are all alike, I shall describe only one of them in detail. Each unit may include a base, which consists of a shallow pan 50 from which rises a hollow box-like structure or cabinet 51, the top of which is approximately at an angle of thirty degrees to the horizontal, and which slopes forwardly and downwardly as best shown by Fig. 5. The bases for the end units may have their pans laterally extended, and the inner side walls of the end pans and the side walls of the intermediate pans may be omitted, so that said pans may form a common receptacle for the oil or cooling medium which is used in the machine. Upon each base is bolted or otherwise secured a box-like main frame casting, one of which is indicated at 52. At the top of this frame is formed what may be called the bedplate 53, which is, as stated, inclined at an angle of thirty degrees upwardly and rearwardly so as to form a relatively flat surface down over which the chips and cuttings may flow, as shown in Figs. 1 and 5. The bases and frames of the units may be secured together by bolts or other convenient fastenings so that the machine as a whole will comprise any desired number of the units rigidly fastened together. If desired, the units need not be connected together but may be separated and each constitute a single machine. The units at the ends of the machine may have along their outer sides U-shaped chip chutes 54 for directing cuttings, which escape laterally, forwardly and downwardly into the chip pan. The chip pans themselves are indicated at 55, there being one located in front of each of the units. Each chip pan consists of a receptacle which is substantially U-shaped in cross section and which is provided on its front wall with lugs 56 resting on the front wall of the base pan. The weight of each receptacle or chip pan is such as to hold it in the position shown in Figs. 1 and 5, with its open upper portion in position to receive chips or cuttings sliding off from the front lip of the bedplate 53. The front wall of the chip pan or receptacle projects upwardly above the lower end of the bedplate 53 to insure the reception of all the chips and cuttings, the rear wall of each receptacle being curved, as shown, so that its upper end will extend under the lower front end of the bedplate and so that it will escape or clear a portion of the operating mechanism. Each receptacle serves also as a cover to conceal a portion of the operating mechanism located below the bedplate and contained within the framework. By tilting the upper end of the chip pan or receptacle, which normally rests against the frame, downwardly and forwardly the contents thereof may be easily removed.

*The work holder.*—Each unit is provided with a chuck or other form of work holder, indicated at 57. Any convenient form of chuck may be used,—for instance as shown in Figs. 25 and 26. The chuck is secured in any convenient way to the upper flanged end or head of the work spindle 58, which is journaled in a bushing 358 located in a block 59 seated in the bedplate. (See Fig. 10). The under face of the spindle head is circularly grooved to receive an annulus on the block 59 to prevent access of chips or cuttings to the bearing. Thrust washers, as at 359, may be employed if desired. The lower end of the work spindle is mounted in a suitable bearing at the lower end of the main frame, there being preferably an adjustable tapering bushing as at 360. The spindle 58 is thus rigidly held against dislocation and is under firm and stable control. The hollow work spindle 59 is rotated at any one of several speeds, as will be explained more in detail. The chuck is substantially waist high and its face is inclined forwardly and downwardly about thirty degrees to the horizontal, and consequently the work is positioned where it can be seen under the most favorable conditions.

*The tool holders.*—In close proximity to the work spindle are two tool carriers 61 and 62, one located in front and the other in the rear of the work spindle. These tool carriers are adapted to oscillate about axis parallel to the axis of the spindle, all of which said axes are in the same plane and perpendicular to the bedplate of the unit, so that from the location of the eyes of the operator they extend downwardly and rearwardly, with the result that the work which is located in the chucks may be observed by the operator and without his assuming a strained or unnatural position while ascertaining the results of the operations, either internal or external, upon the work. Thus the work is presented at the front end of the machine, in easy reach of the operator.

Each of the two tool holders 61, 62 is mounted not only to oscillate as stated to present the tool to the work and to secure a cross feed of the tools, if desired, but it is also mounted to reciprocate axially for length feeds. The tool holder 61 is secured to the upper extremity of a tool slide consisting of a bar 63, the tool holder 62 being secured to the extremity of a substantially similar bar 64. Said bars, near their upper ends but below the tool holders, are journaled and slidably mounted in bosses or bearings 65, 66, cast as a portion of the main frame and extending upwardly from the bedplate. Near their lower ends said bars are similarly journaled and slidably mounted in bearings 67, 68, formed interiorly in the main frame. (See Fig. 8.) Thus each of the tool slides or bars is mounted at each end so as to secure stability of control of the tools and to prevent the tool holders from springing under the stress of the cut. The axially reciprocatory and the oscillatory movements of the tool holders are secured by cam-controlled mechanism, as will be subsequently explained.

Preferably each of the tool holders is provided with a plurality of tool-receiving faces. One face of each tool holder transects the plane of the axes of the two tool holders and the work spindle, as indicated at 69, while the other faces, 70, 71, are at an oblique angle to the face 69 and are arranged on both sides of said plane, as shown by Figs. 1, 4 and 21. In Fig. 4, for example, there is shown as secured to the face 69, a tool for internally turning the hub of a gear blank, said tool comprising a body portion 73 and a double cutter 74 (see Fig. 21) the spindle of which is secured in an eccentric bushing 75 which provides for its lateral adjustment. Upon the faces 70, 71, are respectively secured tools 76, 77, having cutters 78, 79, for turning peripheral portions of the said blank. One of said cutters may be utilized for making a roughing cut, and the other for making a finishing cut. To the other tool holder, 61, I have shown as secured to the faces 70, 71 thereof, two tools 80, 81,—the cutters 82, 83 of which may be utilized for rough-facing and finishing the ends of the hub of the blank. The blank is shown in dotted lines in Fig. 4, and in full lines in Fig. 21, but in Fig. 21 the cutters only are illustrated, the body portions of the tools being omitted for the sake of clearness.

*Tool holder operating mechanisms.*—The hub of the front tool carrier is rigidly secured to its slide bar 63, and to the lower end of said bar is rigidly but adjustably secured a lever 84 the hub of which is indicated at 85. (See Figs. 8 and 9). This lever has pivoted on it a block 86 with which are trunnioned two connecting rods 87, 87, the other ends of which are pivoted to a block 88 on a lever 89 pivoted upon the stud 90 on the under side of the main frame. The lever 89 is operated by the cam drum indicated as a whole at 91, which I shall subsequently describe in detail. The lower end or head of the drum has a revolubly adjustable cam 92 and supplemental revolubly adjustable cams 93, 94 for coöperation with a roll on the lever 89 to cause the oscillation of said lever, and thereby, through the links 87, the oscillation of the lever 84 and the tool slide 63. The tool slide 62 is controlled by the same cam drum 91. As illustrated by Figs. 4, 8 and 21, it will be seen that on the tool holder 62 is formed or secured a rearwardly extending yoke 621 the two arms of which are indicated at 95, 96. These arms of the yoke are located on opposite sides of a rockshaft 97 which carries a cam member indicated at 98. Said cam member is adapted to engage the two arms 95 and 96 of the tool carrier and oscillates the latter in one direction or the other. To this end the cam member has the two oppositely arranged cams 99 and 100 and the two cams 101 and 102. The cams of each pair are adapted to act simultaneously upon the arms 96, 95 so as not only to oscillate the tool holder but also to hold it securely in either extreme position to which it has been moved, or in an intermediate or neutral position with the tools out of engagement with the work, as will be readily understood. The two arms of the tool carrier are provided with wearing blocks 103 and 104, of which one is shown in Fig. 23. These blocks are made of hardened steel and are located in sockets provided for them in the arms, being held in place by the clamps 105 and screws 106. The wearing blocks have ribs or projections 107 and 108 for coöperation with the cams 99, 100, 101 and 102. The rockshaft 97 extends downwardly through a bearing 397 afforded by the bedplate and has on its lower end an arm 109 located in proximity to the upper end of the drum 91 so that it may be oscillated in one direction or the other by cams located upon the upper end of the drum. The arm 109 has a roller 110 (see Figs. 11, 20 and 24) adapted to be engaged by cams 111, 112, 113, 114, adjustably secured to the upper end of the drum 91. By employing cams of varying curvatures and of varying characteristics, the two tool carriers may be oscillated slowly or rapidly, as the case may be, to comply with the particular requirements of the job, this variation in speed of oscillation being secured likewise by the variation in speed of the cam drum. The wearing blocks 104 are elongated from top to bottom, as are the arms of the yoke forming a portion of the tool holder, so that the tool holder itself may be reciprocated relatively to the cam member 98 without being disengaged therefrom. To protect the sliding surface from chips and cuttings, the rear tool carrier may be equipped with a hood 298, as shown in Fig. 1.

Mechanism is provided, as previously indicated, for axially reciprocating the two tool carriers. Referring now to the tool carrier 61, the mechanism for reciprocating it and the tool slide 63 comprises the following mechanism: The hub 85 of the lever 84 which is located at the bottom or lower end of the slide bar 63, is provided with a second arm 115, as shown in the inverted plan— Fig. 9. Extending underneath the laterally extended segmental arm 115 is one end of a lever 116 which carries a roll 117 to engage the said arm. This lever 116 is fulcrumed near its middle upon a stud 118 (see Figs. 5, 7 and 9), and on its other end it has a roll 119 adapted to be operated by cam 120 placed upon the periphery of the cam drum 91, and adjustably secured thereon. During the course of the rotation of the cam drum the lever 116 is rocked so as to feed the tool carrier up and down according to requirement, thus carrying the tools on the carrier longitudinally of the axis of the work for turning the work externally or internally, as the case may be.

The mechanism for axially reciprocating the tool carrier 62 is very simple, consisting merely of a hub 121 secured to the slide bar 64 (see Figs. 5 and 6) and equipped with a roll 122 adapted to be operated by cam 123 placed upon the periphery of the cam drum 91. To hold the hub 121 against rotation about the axis of the slide bar, it has an arm 124 (see Figs. 6 and 28) the end of which is forked to embrace a stationary stud 125 depending from the bedplate. Thus it will be seen that the single cam drum is provided on its ends with adjustable cams which, through the mechanisms described, effect the oscillation of the tool carriers to present for operation the desired tools thereon, and to cross-feed the said tools if desired, and is also provided with cams upon its periphery which through the mechanisms described effect the longitudinal reciprocation of the tool carrier for length-feeding the tools. These various cams are so placed that when the mechanism as a unit comes to a state of rest the tool carriers are in elevated position, with the tools out of engagement with the work. One of these cam drums is shown in detail in Figs. 14 to 17 inclusive. These figures show the cam drum as being a cylindrical structure with heads or ends having hubs so that it may be secured upon its supporting shaft. The periphery and the heads of the cam drum are grooved and are provided with numerous rows of perforations so that the cams may be adjustably secured thereto in the desired location. The cam-supporting shaft is indicated as a whole at 130, and it is secured at its ends in the main frame of the unit, as shown in Fig. 5.

*Main power shaft and clutch mechanism.*—I will now explain how the work spindle of each unit is driven at either of several speeds and then explain the mechanism for causing the rotation of the drum at any one of several speeds. Each unit is provided with what may be termed a main or prime power shaft, the said shafts of the several units being arranged end to end and secured together so as to form, as it were, the sections of a single shaft. Each section of the shaft is indicated as a whole at 131, and at one of the end units this shaft is provided with a pulley 132 by which it may be rotated from any suitable motor or other source of power, see Figs. 7 and 9. Each shaft section is journaled in suitable bearings 133, 134, and has at one or both ends toothed couplings 135, 135 keyed thereon and adapted for engagement with the corresponding couplings of the next succeeding section, as shown, for example, in Fig. 10. When the sections of the shaft are coupled together they are driven constantly in unison. On each section there is a suitable main clutch controlled by a lever or handle in front of the unit. I may conveniently employ a disk clutch, indicated as a whole at 136 (see Fig. 19) and comprising an inner sliding sleeve 137 keyed to the shaft and an outer chambered sleeve 138. Between the two members 137, 138 are the usual disks 139. The sleeve 137 is connected by a pin 140 with an internal sliding rod 141 so that it may be moved to compress the disks against the member 138 and clutch the latter to the shaft. This rod is engaged by a spring 142 which tends normally to open the clutch. The rod is moved by the dogs 143, arranged in slots in the shaft section 130, with which coöperates a sliding peripherally-grooved sleeve 144. In Fig. 19 the clutch-operating sleeve 144 is shown in position to clutch the member 138 to the shaft. Keyed upon the member 138 there is a hub provided with the spur gear 145 and the bevel gear 146. From the spur gear 145 power is transmitted to the drum, whereas from the bevel gear 146 power is transmitted to the work spindle.

The main clutch 136 is controlled by a controlling lever 147 which is located at the front of the unit and which normally projects upwardly so as to be within the easy reach of the operator. As shown in Figs. 27 to 31 inclusive, taken in connection with Fig. 10, the controlling lever is connected with the clutch sleeve 144 by the following mechanism: Located in parallelism with the main shaft 131 there is a slide bar 148 to which is secured a yoke 149 provided with rollers engaging the peripheral groove of the clutch sleeve 144. A spring 150 tends to move the bar 148 in position to move the clutch lever to disengage the clutch from the shaft. The slide bar 148 is moved against the tension of the spring by a bellcrank 151 (see Fig. 28) one arm of which is forked to embrace the bar 148 so as to engage a crosspin 152 passing therethrough. The other arm of the bell-crank is connected by a link 153 with an arm or lever 154 located beneath the bedplate, as shown in Fig. 10. The said arm is secured upon a rockshaft 155 which extends forwardly as shown in Fig. 8 and has secured thereon, on its end which projects through the front wall of the frame, the controlling lever 147. By moving the upstanding handle 147 in one direction or the other, the main clutch may be operated to connect or disconnect the gears 145, 146 with the main shaft 131, as will be readily appreciated.

*Knock-off mechanism.*—At this point it may be as well to explain the knock-off mechanism, inasmuch as it coacts directly with the manually operated clutch-controlling devices just described. This knock-off mechanism comprises a rockshaft 156 which is parallel to and immediately above the rockshaft 155 beneath the bed plate, as has just been explained. (See Figs. 8 and 27). This rockshaft carries at its inner end a curved arm 157 (see Figs. 27 and 29) on the end of which there is a pin 158 adapted to be engaged by a wedge-shaped cam 159 located upon the periphery of the cam drum at its upper end. (See Figs. 29, 32 and 15). At the proper point in the rotation of the cam drum the cam 159 engages the pin 158 and rocks the arm 157 upward so as to rock the shaft 156. The forward projecting end of the shaft has a knife-edge, as shown at 160, to be engaged by a complementally shaped pin 161 carried by the controlling lever 147, as best shown in Fig. 30. When the arm 147 is swung to the left in Fig. 30, the pin 161 slides over the knife-edge 160 of the shaft 156, which yields to permit it to pass, and then engages the knife-edge, as clearly shown in the last-mentioned figure, so as to hold the controller lever to the left. When the cam 158 finally rocks the arm 157 upward and the shaft 156 is rocked, the knife-edge releases the pin 161, and the controller lever automatically swings to the right so as to disengage the main clutch from the drive shaft and stop the operation of the unit. The pin 161 is so located in its socket that it may be manually rocked to disengage it from the knife-edge 160 and permit the controller to be operated by the operator at any time. There is located in the lever 147 a rod 162 which may be forced downwardly by the operator for the purpose of rocking the pin 161 about its peripheral flange 1611. The rod and the pin are held normally in operative position by a spring-pressed pin 163, all as shown in Fig. 30. From this explanation it will be apparent that in the specific embodiment of the invention herein described, after the various instrumentalities of each unit have completed their sequence of operations and the cam drum is about completing its rotation, the knock-off mechanism will be operated to disengage the main clutch from the shaft 131 and stop the operation of the unit, all without in any way affecting the operation of the various instrumentalities of the other units.

*Cam drum operating mechanism.*—I will now explain the mechanism by which the drum is rotated at varying speeds from the spur gear 145 on the main shaft, reference being had to Figs. 6, 9 and 10. Immediately above the shaft 131 there is located an intermediate shaft 165 which is provided with a spur gear 166 constantly in mesh with that at 145. This shaft is journaled in suitable bearings afforded by the frame. On its right-hand end, as shown in Fig. 6, the said shaft 165 has a bevel gear 167 intermeshing with a bevel gear 168 on a sleeve 169 loosely mounted upon the front-to-rear shaft 170 parallel to the plane of the bedplate. The shaft 170 is provided with a worm 171 engaging a worm wheel 172 formed on the drum. (See Figs. 5 and 6.) When the sleeve 169 is fast to the drum-driving shaft 170, the drum is driven at high speed directly from the shaft 165 and hence from the main drive shaft 131. By cam-controlled mechanism, however, the sleeve 169 and the gear 168 may be unclutched from the shaft 170 and the latter driven at slow speed through another train of gearing from the work spindle, as will be subsequently explained. However, at this time there may be described the mechanism for controlling the clutch by which the bevel gear 168 is clutched to the shaft 170. By an examination of Figs. 6 and 12 it will be observed that there is located in close proximity to the drum, and in the rear thereof, a vertically inclined stud shaft 173 mounted in brackets 1173, 1174. On said stud shaft is loosely mounted a two-armed lever 174. One end of this lever is provided with a pin or projection 175 adapted to be engaged by a cam 176 on the drum 91. This cam is adjustable about the periphery of the drum. The other end of the lever 174 is connected by a rod 177 with a clutch 178 (see Figs. 5 and 6) keyed upon the shaft 170 but slidable thereon. By a spring 179 shown in dotted lines in Fig. 6, the clutch 178 is held normally in position to clutch the bevel gear 168 to shaft 170. When the cam 176 engages the two-armed lever 174 it rocks the longer end forward so as to move the clutch sleeve 178 and disengage the fast bevel gear 168 from the shaft 170, whereupon the shaft will be driven at slow speed from the work spindle, as will subsequently be explained.

*Work-spindle drive.*—I will now explain the mechanism by which the work spindle is rotated at different speeds. This mechanism, as previously indicated, is driven primarily from the bevel gear 146 on the main drive shaft. By an examination of Figs. 5, 6 and 7, it will be observed that the said bevel gear 146 is in mesh with and drives a bevel gear 180 on a shaft 181 which extends toward the front but which is inclined to one side, and is therefore out of parallelism with the shaft 170. (See Fig. 6.) The front end of the shaft projects through the front wall of the main frame of the units and is equipped with a loose gear 182 which is adapted to be clutched to the shaft by a disk clutch indicated as a whole at 183. This disk clutch is controlled by the sliding clutch sleeve 184 and may be thrown into and out of operative position automatically from the cam drum. To accomplish this the clutch lever 184 is moved in one direction or the other by a yoked lever 185 having a spring-tensioned arm 186. The said lever 185 is connected by a connecting rod 187, shown in dotted lines in Figs. 6 and 7 and partially in full lines in Fig. 9, the rear end of which is connected with an arm 188 pivoted on the stud shaft 173 previously referred to. This last-mentioned arm or lever 188 has a pin or projection 189 adapted to be engaged by a cam 190 placed upon the periphery of the cam shaft. (See Figs. 7, 9, 13 and 15.) During predetermined portions of the rotation of the drum, the arm or lever 188 will be rocked to throw in the clutch 183 and clutch the high-speed gear 182 to the shaft 181. The gear 182 intermeshes with a change gear 191 upon an intermediate shaft 192 parallel to and above and to one side of that at 181. This shaft is provided on its rear end with a bevel gear 193 engaging a bevel gear 194 on the work spindle. (See Figs. 5, 6 and 8.) The gears 182 and 191 are removable so as to be replaced by other gears for giving the desired ratio of rotation between the shafts 181 and 192 and therefore giving the desired high speed of rotation to the work spindle. There is another set of gears between the shaft 181 and the shaft 192 by which the latter will be driven at low speed when the high-speed gears are unclutched. This set comprises the gear 195 fast on the shaft 181, and a large spur gear 196 which is connected by pick-up ratchet clutch mechanism with the shaft 192. It is unnecessary to explain this pick-up ratchet clutch in detail as it is well known. It is sufficient to say that when the high-speed gears are in operation the shaft 192 travels at high speed even though the gears 195, 196 continue to operate, the ratchet permitting the gear 196 to rotate slower than the shaft. When the high-speed gearing is thrown out, however, the ratchet clutch in the gear 196 rotates the shaft 192 with a low speed. From this description it will be apparent that the work spindle will be rotated at either of two different speeds, and that the speed-changing mechanism is under the control of the drum, in consequence of which the work spindle can be rotated rapidly or slowly, according to the work that is being performed by the tool.

I have already stated that the drum is driven at slow speed from the spindle-driving mechanism, and I will now explain the connections between the drum and the spindle. On the lower end of the work spindle 59 there is a gear 200 (see Figs. 5 and 8) which intermeshes with and drives a gear 201 on a short shaft 202 parallel to the work spindle. This last-mentioned shaft is provided with a worm 203 engaging and driving a worm wheel 204 on a front-to-rear shaft 205. This shaft carries on its end which projects through the front wall of the frame a change gear 206 intermeshing with and driving a change gear 207 on the drum-driving shaft 170. Normally the drum is thus driven at high speed from the main drive shaft 131 by the instrumentalities which I have previously explained. At such times as may be required, for instance when the tool carriers are to be rocked to cross-feed the tools, or are reciprocated to length-feed the tools, in which case the drum should be rotated at slow speed, the lever 174 is operated by a cam on the drum to shift the clutch 169 so as to unclutch the bevel gear 168 from the shaft 170 so that the work spindle may drive the drum at slow speed so long as the clutch 178 remains in unclutched position. To permit this, the worm wheel 204 is connected to its shaft 205 by a pick-up ratchet clutch mechanism of the kind previously referred to. Thus while the machine is in operation the drum-driving shaft 170 will be driven at all times at high speed from the main drive shaft, except when the clutch 178 is moved to an inoperative position by the cam 190 on the drum, through the medium of the lever 174 and the rod 177, during which time the drum will be driven at slow speed from the work spindle.

I have not attempted to set forth in detail the particular means by which the various shafts are journaled, nor the various brackets upon which some of the operating parts are mounted, as a description of these details is not necessary for a complete understanding of the machine and its mode of operation. Nor is is necessary to explain the conduits by which oil is supplied for lubricating the various bearings. I may, however, state briefly that one of the units may be provided with a pump, indicated as a whole at 250 in Fig. 8, by which soda water or other like cooling compound may be delivered to the cutters. This pump is driven by a shaft 251 on which is a pulley 252 driven by a belt 253 from a pulley 254 adjacent the main driving pulley 132. The cooling compound is delivered from the pump through conduits 255 to the interior of the tool holders, from which it is distributed by ports, not shown, to the cutters. I may also point out that, if desired, supplemental means may be utilized for holding the main cam drum against longitudinal movement, as when the cams thereon are operating. In Fig. 8, for example, I have illustrated a shoe 260 which bears against the upper head of the drum, said shoe being supported by a bar 261 inserted in the bedplate. A thrust bearing or stationary shoe 262 bears against the lower end of the drum, as shown in Fig. 7.

The operation of the machine need not be described, as the mode of operation of the various parts has already been described in detail. Moreover, the sequence of operations depends upon the character of the piece of work which is being machined. For example, in one unit a gear blank may be rough turned and finished and also rough faced and finished during one cycle of operations; or, if desired, a part of the operations can be performed by one unit and the remainder completed in another. Each unit is capable of performing a variety of operations, all of which will be accomplished automatically after the operator has thrown in the main clutch by the operating handle.

While it may be desirable that a machine should include all of the various features herein described, and illustrated upon the drawings, it will of course be apparent that some may be omitted, or used without the others, without departing from the spirit and scope of the invention.

The arrangement of the oscillating and reciprocating tool holders in close proximity to the work holder, provides for bringing the tools into working position with a minimum of lost time, and their construction is such as to prevent springing, or chattering of the cutters. That is, the bed plate of the frame is provided with two upstanding relatively thick bosses 65, 66, which are brought as closely as possible to the work holders. To shorten the distances between the centers or axes of the slide bars 63, 64 and the axis of the work spindle the sides of the bosses next the chuck are substantially flat, and the metal much reduced, leaving between the chuck and said sides only enough space to receive the plates 399, which are fastened to the telescoping flanges 299. Thus the tool carriers are relatively short, being of only sufficient length to bring the tools into proper relation to the work; and since they consist of heavy blocks or castings and are of short leverage, they will not spring or give. Furthermore, the slide bars are thick and powerful, and are mounted at their lower ends in bearings to increase the stability of tool control. The tool holders, when the tools are cutting, are in the plane of the work, and torsional strains are thus avoided between the slide bars and the tools. The arms or levers which rock the tool slides, i. e., the arm 85 of slide 63, and the yoke 621 of slide 64, are of sufficient length to give the proper leverage for rocking the tool holders. In connection with said tool holders, it may be observed that the cams on the drum are so formed and arranged as to oscillate them to bring the tools to cutting position and to hold them there, in case the tools are thereafter length-fed for turning, or then gradually to cross-feed them if a facing operation is desired. The cams will be formed, of course, for securing the particular operation which is desired to be performed on the work. In order to secure a relatively narrow unit, one of the tool holders is arranged in front of, and the other in the rear of the chuck or work holder, but I should not regard a different location of said tool holders (for instance, at the sides of the chuck) as a departure from my invention. The main frame of each unit is detachable from the bed, and interchangeable beds of different heights or inclination may be employed, according to requirements.

I desire to call attention to the fact that the work is presented to the operator at the front end of each unit, in the illustrated embodiment of the invention, by reason of the angular arrangement of the work spindle, and this angularity can be increased or diminished by changing the angle of the frame. Even were the work spindle upright, or were the supporting surfaces of the base approximately vertical and the work spindle therefore substantially horizontal, the work would be placed so as to be accessible at the front end of the relatively narrow structure, and hence, with a number of the units banked together in parallelism the pieces of work would be located for comfortable observation and constant inspection simultaneously by the operator.

Practically all of the operating mechanism is located below the slanting bedplate or table, and the only parts located thereabove are the chuck and the tool carriers. Hence there are no overhanging parts to obscure or prevent a constant and complete observation of the action of the tools. Moreover, all of the power-transmitting mechanisms for effecting the operation of the work spindle and the tool holders are covered to prevent the dropping of chips and cuttings therein. For this purpose the two tool holders are formed or provided with the depending flanges 299 and the plates 399 which telescope over the bearings 65 and 66 respectively to prevent the access of chips to said bearings.

I have herein used the terms "front" and "rear" in the sense that that portion of the machine which the operator normally faces is the front and the opposite portion is the rear, being the farthest from the operator. Thus the work spindle extends "downwardly" and "rearwardly" and the frame itself is tilted "forwardly" and downwardly, in relation, as it were, to the normal position of the operator. Thus, though the bed plate constitutes the top of the frame when the frame is horizontal, and the front of the frame, when the latter is tilted forward through an angle of sixty to ninety degrees, yet in each case the work holder may be said to be at the front end of the frame or the unit, in the sense that it is located close to the operator when he is in his normal position, where without fatigue or much muscular exertion he can watch the operation on the work to the best advantage. With substantially the same result, the frame could be tilted rearwardly from the position shown, bringing the drum underneath the frame, and in that case the operator would necessarily change his position and face the "front" of the machine, which would then be in a different location. Hence the words "front," "rear," "upward," "downward," "forward" and "backward" are used for the purposes of description and not of limitation unless the sense necessarily requires it.

I do not claim herein the features of construction and arrangement which the present invention has in common with the invention disclosed and claimed in my said application Serial No. 819,439.

Having thus explained the nature of the invention and described one embodiment thereof, without, however, attempting to set forth all the forms in which it may be embodied, or all the modes of its use, what I claim is:

1. A multi-spindle lathe comprising a plurality of separable or detachable units arranged side by side, each unit having a work holder, and a tool carrier, arranged to feed the tools lengthwise and crosswise of the work, mechanism for operating the same, and means for detachably connecting said units.

2. A multi-spindle lathe comprising a plurality of units arranged substantially in parallelism side by side, each unit being provided with a work holder accessible at its front end, a tool holder movable to cause length feeds and cross feeds of the tools, mechanism for operating said tool holder, a controller at said front end for controlling said mechanisms, and mechanism for moving said tool holder longitudinally and transversely of the work holder for the length feed and cross feed of the tools.

3. A multi-spindle lathe comprising a plurality of units arranged side by side, each unit being provided with a work holder accessible at its front end, a tool holder movable both longitudinally and transversely of the work holder, clutch-controlled mechanism for operating said holders, and a clutch controller, and a common drive shaft for all of said units.

4. A multi-spindle lathe comprising a plurality of substantially parallel independent units, each unit comprising a narrow frame, a work holder located to be accessible from the front end of said frame, a tool holder movable longitudinally and laterally with respect to the work holder, clutch-controlled mechanism for operating said work holder and tool holder, a controller lever at the front end of the frame, and a drive shaft, in combination with means for securing said frames together, and means for coupling said shafts together.

5. A multi-spindle lathe comprising a plurality of substantially parallel narrow units arranged side by side and each having a work holder with its axis at an angle to the vertical and accessible at its front end of the unit whereby a single operator may inspect and control the operations on the work of a plurality of such units simultaneously.

6. A multi-spindle lathe comprising a plurality of substantially parallel narrow separable units arranged side by side and each having a rotary work holder and a tool holder accessible at its front end whereby a single operator may inspect and control the operations on the work of a plurality of such units simultaneously, each unit having means for operating the tool holder to cause length and cross feeds of the tools, and a common drive shaft for said units.

7. A multi-spindle lathe comprising a plurality of separable substantially parallel complete narrow units arranged side by side and each having a rotary work holder accessible at its front end whereby a single operator may inspect and control the operations on the work of a plurality of such units simultaneously, each unit having means for operating the tool holder to cause length and cross feeds of the tools, a common drive shaft for said units, formed in detachable sections, with one section mounted in each unit, and means for securing said units together.

8. A multi-spindle lathe comprising a plurality of separable substantially parallel narrow units arranged side by side and each having a work holder and a tool holder movable longitudinally and laterally of the work holder, both holders being accessible at the front end of each unit whereby a single operator may inspect and control the operations on the work of a plurality of such units simultaneously, each said unit being further provided with a drive shaft, operative actuating connections between said shaft and said tool holder to cause a length feed and cross feed of the tool, and a controller lever located at the front end of such unit.

9. A lathe comprising a narrow frame, a rotary work holder accessible from the front end thereof, a tool holder movable both longitudinally and laterally of the work holder for length and cross feeds, mechanisms for operating the work holder and the tool holder, and a controller therefor located at said front end of the frame in proximity to said work holders, whereby an operator, standing in front of said front end, may inspect and control the operations on the work in said holder.

10. A lathe comprising a frame, and a work spindle arranged at an inclination downwardly and rearwardly from the front and having a work holder at its upper end whereby the work is presented to an operator standing in front of the front end of said frame.

11. A lathe comprising a narrow frame, a work spindle arranged to incline downwardly and rearwardly from the front, a work holder on the upper end of said spindle, a tool holder, mechanism for operating said spindle and tool holder, and a controller located at said front end of the frame, in proximity to said work holders.

12. A lathe comprising a narrow frame, a rotary work holder accessible to the operator from the front end thereof, a tool holder, and mechanism for operating said holders, in combination with means by which said frame is held at an inclination with its front end lower than its rear end so as to present the said holders at a corresponding inclination.

13. A lathe comprising a frame having a bed plate inclined downwardly and forwardly, a rotary work holder above said bed plate, and similarly inclined to present the work toward the front of the frame.

14. A lathe comprising a frame, a work spindle journaled therein and extending downwardly and rearwardly from the front end of said frame, and a work holder on said spindle and having its face exposed toward the front of said frame.

15. A lathe comprising a frame having a downwardly and forwardly inclined bed plate, a work spindle perpendicular to said plate and journaled in said frame, and a work holder located above said plate and secured to said work spindle.

16. A lathe comprising a frame having a downwardly and forwardly inclined bed plate, a work spindle perpendicular to said plate and journaled in said frame, a work holder located above said plate and secured to said work spindle, a reciprocatory tool slide in parallelism with the work spindle and mounted on said frame, and a tool holder located above said bed plate and secured upon the upper extremity of said tool slide.

17. A lathe comprising a frame having a downwardly and forwardly inclined bed plate, a work spindle passing through said plate and perpendicular thereto, a chuck above the bed plate and secured to the upper extremity of said work spindle, a reciprocatory tool slide perpendicular to said bed plate and passing therethrough, and a tool holder secured to said slide, and mechanisms for operating said work spindle and tool slide.

18. A lathe comprising a plurality of narrow parallel units, each being arranged at an angle to the vertical and to the horizontal, each unit having a work holder at its front end, and a downwardly and rearwardly inclined work spindle.

19. A lathe comprising a plurality of narrow parallel complete units, each being arranged at an angle to the vertical and to the horizontal, each unit having a work holder at its front end, a downwardly and rearwardly inclined work spindle, in combination with a common drive shaft for all of said work spindles, and clutch controlled mechanism in each unit driven by said shaft for operating the work spindle thereof.

20. A lathe comprising a plurality of narrow parallel units, each being arranged at an angle to the vertical and to the horizontal, each unit having a work holder at its front end, a downwardly and rearwardly inclined work spindle, clutch-controlled mechanism for driving the work spindle, and a clutch controller at said front end, in combination with a common drive shaft for all of said clutch-controlled mechanisms.

21. A lathe comprising a plurality of narrow parallel units, each being arranged at an angle to the vertical and to the horizontal, each unit having a work holder at its front end, a downwardly and rearwardly inclined work spindle, clutch-controlled mechanism for driving the work spindle, and a clutch controller at said front end, in combination with a common drive shaft for all of said clutch-controlled mechanisms, said shaft being formed in detachable sections, one for each unit, means for coupling said sections together, and means for coupling said units together.

22. A lathe comprising a frame, a work spindle having a work holder on one extremity thereof, an oscillatory slide bar, a tool holder on the extremity thereof, and having oppositely arranged tools for operating alternately on the work, and instrumentalities for rotating said work spindle and for reciprocating and for oscillating said slide bar.

23. A lathe comprising a frame, a work spindle having a work holder on its extremity, a slide bar parallel to the work spindle and having a tool holder on its extremity, a drum, cams on said drum for reciprocating and oscillating said slide bar for length feeding and cross feeding said tool holder, change-speed mechanism for driving said work spindle and said drum at different speeds, and cams on said drum for controlling said change-speed mechanism.

24. A lathe comprising a work holder, a reciprocatory tool slide, a tool holder on said tool slide, a lever for reciprocating said tool slide, a lever for oscillating said tool slide, and a drum having cams for operating said levers.

25. A lathe comprising a frame having a bed plate, a work holder outside of said bed plate, a reciprocatory tool holder outside of said bed plate, a work spindle passing through said bed plate, a tool slide passing through said bed plate, a cam drum inside of said bed plate, means in said frame and operated by said drum for reciprocating said tool slide, and means in said frame and controlled by said drum for driving said drum at varying speeds of rotation.

26. A lathe comprising a work spindle, an oscillatory and reciprocatory tool holder, a drive shaft, a drum, means operated by the drum for oscillating and reciprocating said tool holder, change-speed mechanism driven by said shaft and controlled by said drum for rotating the work spindle at different speeds, drum-controlled mechanism driven by said shaft for rotating said drum at one speed, and drum-controlled mechanism driven by the work spindle for rotating said drum at another speed.

27. A lathe comprising a work spindle, an oscillatory tool holder having a yoked lever, oppositely arranged tools on said tool holder, a rockshaft having cams for simultaneously engaging the yoke arms of said lever and oscillating said tool holder to and holding it in different positions to move the several tools to and holding them in cutting position, and mechanism for rocking said rock shaft.

28. A lathe comprising a work spindle, an oscillatory tool holder having a yoked lever, oppositely arranged tools on said tool holder, and a rockshaft having cams for engaging the yoke arms of said lever and oscillating said tool holder to and holding it in different positions to move the several tools to and hold them in neutral or in cutting position as the case may be, in combination with means for reciprocating said tool holder axially for length-feeding the tools.

29. A lathe comprising a work spindle, an oscillatory tool holder having a yoked lever, oppositely arranged tools on said tool holder, and a rockshaft having cams for engaging the yoke arms of said lever and oscillating said tool holder to and holding it in different position to move the several tools to and holding them in cutting position, in combination with a cam drum having cams for reciprocating said tool holder to obtain length feeds of the tools, and for oscillating said rockshaft.

30. A lathe having a relatively narrow frame, an inclined work spindle at its front end, a work holder on the front extremity of said spindle, a tool holder in proximity to said work holder, operating mechanism including a clutch-controlled drive shaft for actuating said spindle and the tool holder, a rearwardly extending bar for controlling said clutch, and an operating handle at the front end of the frame, in proximity to the work holder, for operating said bar.

31. A lathe comprising a frame having a downwardly and forwardly inclined bed plate with a forwardly projecting boss, a downwardly and rearwardly inclined spindle having a work holder closely adjacent said boss, the wall of said boss next adjacent the work holder being reduced in thickness, a slide bar slidably journaled in said boss, a tool holder formed or secured on the extremity of said slide bar, and means for oscillating said slide bar.

32. A lathe comprising a frame having an inclined bed plate with a forwardly projecting boss, a spindle having a work holder closely adjacent said boss, the wall of said boss next adjacent the work holder being reduced in thickness, a slide bar slidably journaled in said boss, a tool holder formed or secured on the extremity of said slide bar, and means below or in the rear of said bed plate for reciprocating said slide bar.

33. A lathe comprising a frame having a bed plate with a projecting boss, a spindle having a work holder closely adjacent said boss, the wall of said boss next adjacent the work holder being reduced in thickness, a slide bar slidably journaled in said boss, a tool holder formed or secured on the extremity of said slide bar, and a second bearing below and remote from said bed plate for the lower end portion of said bar.

34. A lathe comprising a work spindle having a work holder, oscillatory and axially reciprocatory tool holders adjacent said work holder, a cam drum, and mechanisms operated by said cam drum for oscillating and reciprocating said tool holders independently of each other.

35. A lathe comprising a work spindle, a plurality of tool slides each mounted to move about an axis parallel to the axis of the work spindle, a cam drum, and mechanisms operated by said drum for axially reciprocating said tool slides independently of each other, and mechanisms operated by said cam drum for oscillating said tool slides independently of each other.

36. A lathe comprising a work spindle, a plurality of tool slides each mounted to move about an axis parallel to the axis of the work spindle, a cam drum, and mechanisms operated by said drum for axially reciprocating said tool slides independently of each other, mechanisms operated by said cam drum for oscillating said tool slides independently of each other, a drum shaft, and speed-changing mechanism controlled by said drum for rotating said drum at different speeds.

37. A lathe comprising a frame having a bed plate, a rotary work holder and a tool holder on one side of the bed plate, and mechanism on the other side of said bed plate for rotating said work holder and oscillating and reciprocating said tool holder.

38. A lathe comprising a rotary work holder, a tool slide, a drive shaft, a cam drum for operating said tool slide, a main clutch for the drive shaft, a controller lever and connections for operating the clutch, and a knock-off mechanism comprising a cam on the drum, a rockshaft operated by said cam, and means on said rockshaft for locking and releasing said controller lever.

39. A multi-spindle lathe comprising a row of parallel work spindles with their axes in a common inclined plane, a drive shaft, a plurality of power-transmitting connections between said drive shaft and said spindles, a plurality of tool holders, and mechanisms operated by said drive shaft for actuating said tool holders to cause the tools thereon to operate upon the pieces of work in the work holders.

40. A multi-spindle lathe comprising a row of parallel work spindles with their axes in a common inclined plane, a drive shaft, power-transmitting connections between said drive shaft, and each of said work spindles including a clutch, and a separate controller for operating each clutch.

41. A multi-spindle lathe comprising a row of parallel work spindles with their axes in a common plane, a drive shaft, a rotatable drum associated with each spindle and receiving its motion from said shaft, a tool holder associated with each spindle, and mechanism operated by the corresponding drum for moving the tool holder lengthwise and crosswise of the work spindle, and means, one for each spindle, for controlling the operation of said drum.

42. A lathe comprising a boxlike frame, a work holder, and an oscillatory tool holder located outside of one wall of said frame, and mechanism within said boxlike frame for rotating the work holder, and oscillating and reciprocating said tool holder, in consequence of which unobstructed access to the work and the cutters on the tool holder is permitted.

43. A lathe comprising a frame having a forwardly and downwardly inclined bed plate, a work holder and a tool holder in front of said plate and arranged at substantially right angles thereto, and mechanism behind or in the rear of the bed plate for actuating said holders.

44. A multi-spindle lathe comprising a plurality of substantially parallel units arranged side by side, and each having a bed plate flush with the bed plates of the adjacent units, a work holder and a tool holder on the front or outer side of said bed plate, and mechanism behind or in the rear of said bed plate for actuating the work holder and tool holder.

45. A lathe comprising a work holder and a tool holder arranged side by side, a spindle on the extremity of which the work holder is fixed, a bar parallel to the spindle and on which the tool holder is fixed, said spindle and bar extending in the same direction in substantial parallelism, mechanism for rotating the work spindle, mechanism for oscillating and reciprocating said bar, and supports for said bar and said spindle, said mechanisms and said supports being all below or in the rear of said holders, whereby they interpose no obstructions between the work and an operator standing in front of the holders.

46. A lathe comprising a work spindle arranged at an angle both to the vertical and horizontal, and having on its upper front extremity a work holder, a slide parallel to the work spindle having on its upper front extremity a tool holder, and mechanisms for rotating the work spindle and oscillating and reciprocating said slides.

47. A lathe comprising a frame having a bed plate presented to the front end of the lathe at an angle to the horizontal, a rotary work holder presented to the front of the machine outside of the bed plate, a reciprocatory tool holder likewise presented to the front of the machine outside of the bed plate, the axis of the work holder and the line of the reciprocation of the tool holder being parallel, but substantially perpendicular to the plane of the bed plate, and mechanism inside of the bed plate for actuating the work holder and the tool holder.

48. A lathe comprising a forwardly extending work spindle having at its extreme front end a work holder, a sliding oscillatory bar parallel to the work spindle and having on its extreme front end a tool carrier, and mechanism for oscillating and for reciprocating said bar, said parts being constructed and arranged to present the work and the tools at the front of the machine without obstruction.

49. A lathe comprising a bed plate arranged at an angle to the horizontal, a work holder in front of the bed plate, a reciprocatory oscillatory tool holder in front of the bed plate, and mechanism behind the bed plate for rotating the work holder and oscillating and reciprocating the tool holder, said parts being so arranged that they are free of overhanging obstructions.

50. A lathe comprising a work spindle, an oscillatory tool holder having a yoked lever, one or more tools on said tool holder, a rock shaft having cams arranged in pairs so that the cams in each pair will rock said tool holder and positively position the tool or tools thereon with reference to the work, the cams and yoked lever being elongated the one with reference to the other in lines axial of the shaft to provide surfaces for controlling the position of the tool or tools during length feeds thereof, and means for axially reciprocating said tool holder to cause a length feed of the tool or tools.

51. A lathe comprising a frame, a work spindle journaled therein at an angle to the horizontal, a slide bar mounted in said frame in parallelism with the work spindle, a cutter carrier on the extremity of said bar, and mechanism below or in the rear of said cutter carrier for oscillating and reciprocating said slide bar, thereby affording unobstructed access to the work and the cutters.

52. A multiple spindle lathe comprising a bed consisting of a plurality of complete separable sections, a plurality of separable frames, one for each bed section, means for attaching each frame to its corresponding bed section, and operative mechanism supported by each frame including a work spindle, a cutter carrier, and clutch controlled instrumentalities for operating said work spindle and said cutter carrier.

53. A lathe comprising a work shaft, mechanism for rocking the same, opposite cams on said shaft, a pivoted tool holder having a yoke straddling said cams, removable cam members detachably affixed to the yoke for coaction with said cams, said members being elongated to serve as guides during the axial movement of said tool holder, and means for axially reciprocating said tool holder.

54. A lathe comprising a work holder and a tool holder, and an inclined plate arranged to receive chips from the work, in combination with a chip receptacle arranged to receive the chips from said inclined plate.

55. A lathe comprising a work holder and a tool holder, and an inclined plate arranged to receive chips from the work, in combination with a movable chip receptacle having an open end and arranged to receive the chips from said inclined plate.

56. In a lathe, the combination with a rotary work holder, of a slide bar, a cutter carrier on said slide bar, a rotary cam carrier, a roller on said slide bar, cams on said cam carrier for reciprocating said slide bar, a rock shaft, cams on said cam carrier for rocking said shaft, and means on said rock shaft for oscillating said slide bar.

57. In a lathe, the combination with a frame, a work-holder and a tool-holder, of an open mouth chip receptacle arranged to receive the chips, and mounted on said frame to swing to position to discharge the chips therefrom.

In testimony whereof I have affixed my signature, in presence of two witnesses.

JAMES HARTNESS.

Witnesses:
 H. T. LAFFIN,
 J. W. WALKER.